Dec. 25, 1934.  G. STERN  1,985,355
ARRANGEMENT FOR TRANSFERRING GASEOUS LIQUIDS UNDER COUNTER PRESSURE
Filed April 12, 1932  2 Sheets-Sheet 1
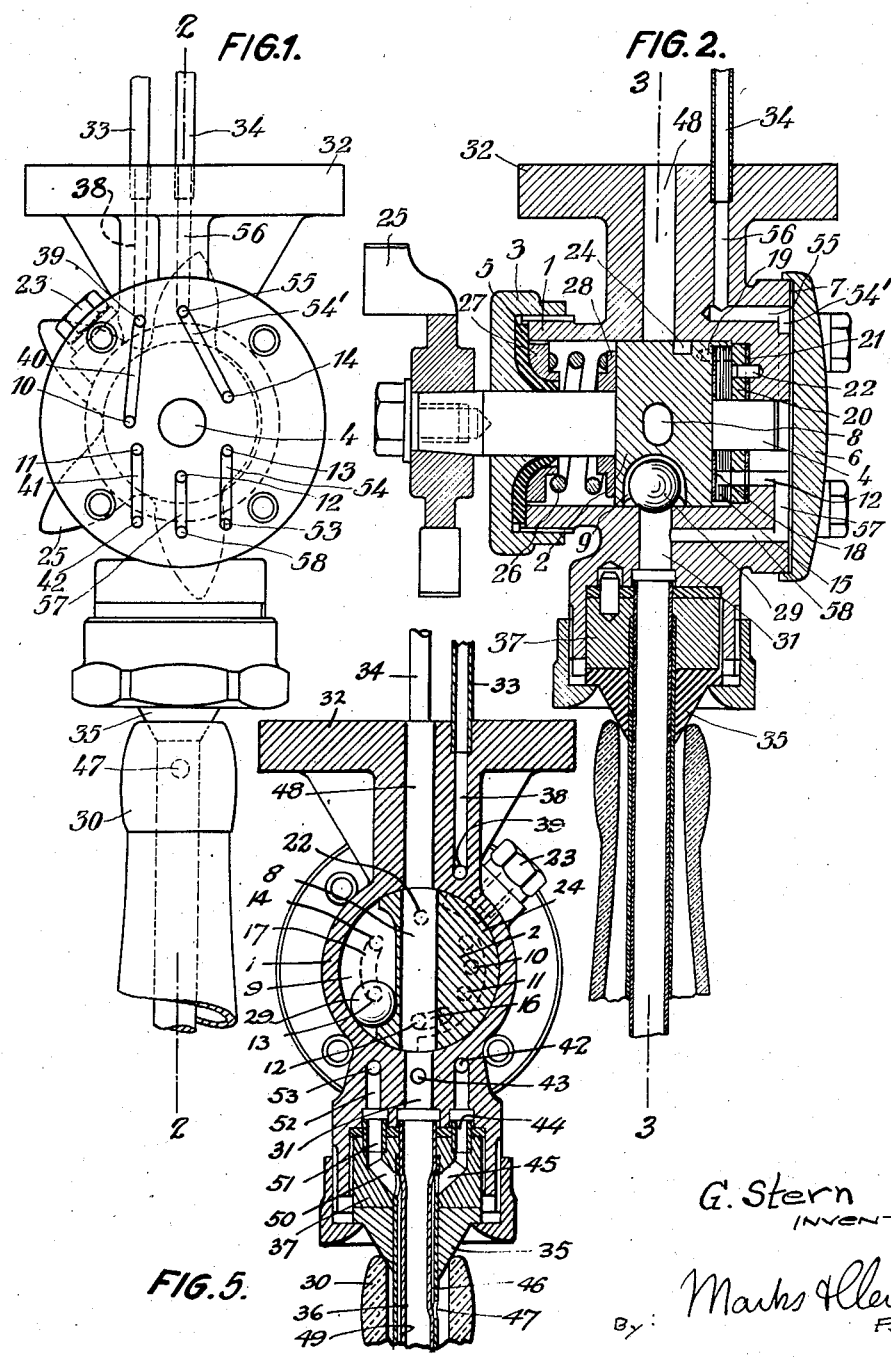

Dec. 25, 1934.  G. STERN  1,985,355
ARRANGEMENT FOR TRANSFERRING GASEOUS LIQUIDS UNDER COUNTER PRESSURE
Filed April 12, 1932  2 Sheets-Sheet 2
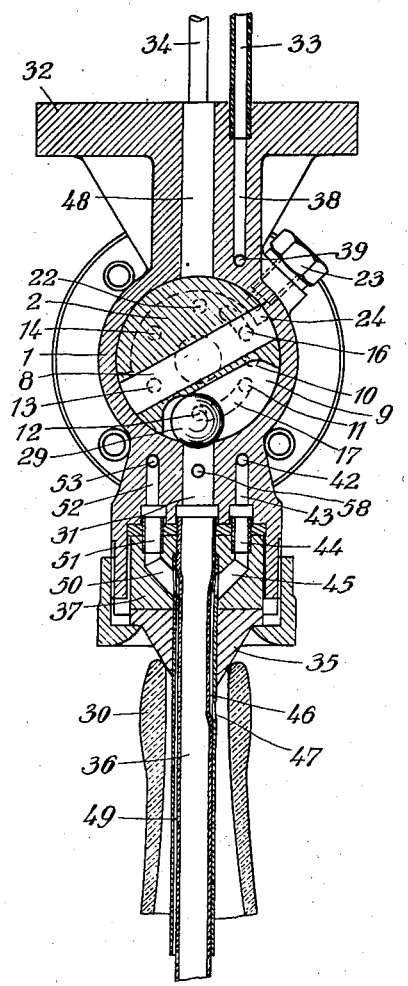
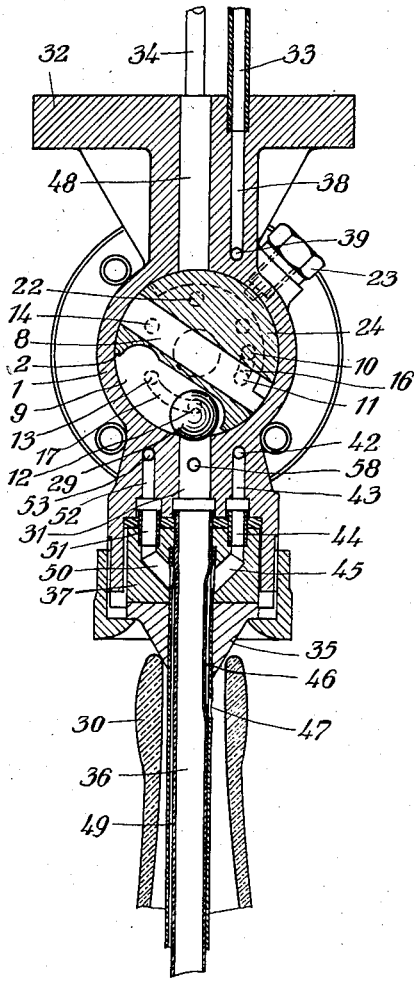
G. Stern
INVENTOR
By: Marks & Clerk
Attys.

Patented Dec. 25, 1934

1,985,355

UNITED STATES PATENT OFFICE 1,985,355

ARRANGEMENT FOR TRANSFERRING GASEOUS LIQUIDS UNDER COUNTER PRESSURE

Gustave Stern, Charenton, France

Application April 12, 1932, Serial No. 604,839
In Germany April 18, 1931

6 Claims. (Cl. 226—115)

This invention relates to an arrangement for transferring gaseous liquids under counter-pressure. It has already been proposed in such arrangements to dispose a rotary flat valve between the storage vessel and the filling tube. In the rotary flat valve passages are provided for the counter-pressure and the escaping air. According to the invention the rotary flat valve is provided with a bore which when the arrangement is in the filling position forms a straight path with the feed pipe and the filling tube, the filling tube being closed by a special closing member, for instance a valve ball. Owing to the fact that according to the invention the liquid to be transferred, for instance beer, follows a straight line path, the formation of froth and an incomplete filling of the bottle is prevented. The arrangement according to the invention is also easy to clean and keeps perfectly tight without any lubrication. It also works easily. The part corresponding to the cock plug does not require grinding in.

In the accompanying drawings a constructional example of the invention is illustrated, Fig. 1 being a view from the rear with the cover removed, Fig. 2 a section on line 2—2 of Fig. 1, Fig. 3 a section on line 3—3 of Fig. 2, with the slide valve in the closed position, Fig. 4 a similar section to Fig. 3 with the slide valve in an intermediate position, and Fig. 5 a similar section to Fig. 3 with the slide valve in the filling position.

In a casing 1 a body 2 for instance of cylindrical shape is disposed so as to turn easily with some clearance. It is journalled at one end in a nut 3 and at the other end in a bore 4 in the casing. A leather collar 5 and a cover 6 with a packing plate 7 close the casing 1 tightly. In the body 2 is a transverse bore 8 and a recess 9 at the periphery. The wall of the casing opposite the nut B is provided externally with a flat face on which the passages 10 to 14 are furnished which extend through the wall. An elastic flat sliding member 15, for instance of leather, is let into the rear face of the body 2. It is provided with elongated holes 16 and 17 and is tight-jointed with respect to the piston surface by a packing plate 18. A pin 19 ensures that the flat sliding member 15 shall turn together with the body 2. 20 is a slide face, the bores of which coincide with the bores 10, 11, 12, 13, 14 already referred to. The slide face is packed with respect to the bottom of the casing by a packing ring 21 and is prevented from turning by a pin 22. A screw 23 on the casing 1 and a groove 24 cut in the body 2 limit the rotary angle of the body 2, to which motion is imparted in a known manner by a toothed pinion 25. A spring 26 with plates 27 and 28 presses the body 2 and the flat sliding member 15 firmly against the slide face 20. In the recess 9 with a certain amount of clearance is a ball 29 which is adapted to close the passage 31 which leads to the bottle to be filled and which is provided with an elastic valve seating, for instance of rubber. The filling arrangement is fixed by means of a flange 32 in a fluid-tight manner to the liquid container. The pipes 33 and 34 extend in a known manner above the liquid level in the storage container. A bottle 30 is pressed tightly in a known manner against a rubber cone 35. The latter is mounted on a filling tube 36, the head 37 of which is connected in a known manner to the casing 1.

There are provided on the flat face of the wall of the casing grooves 40, 41, 57, 54, 54' which establish communication between the passages 10 to 14 and the passages 39, 42, 58, 53, 55 which extend parallel to the passages 10 to 14 in the casing. The passages 39 and 55 are extended in the passages 38 and 56 which are disposed vertically to the passages 39 and 55 and lead to the pipes 33 and 34. The passages 42, 58, 53 communicate with the filling tube 36 wherein the passage 58 directly extends while the passages 53 and 58 are extended by the passages 52, 51, 50 and 43, 44, 45 respectively. The passages 50, 45 extend into an annular passage 46, 49 which is formed between the filling tube 36 and a surrounding tube. A hole 47 is provided in the latter on a level with the bottle neck.

The arrangement according to the invention operates in the following manner:

According to Fig. 3 all the passages leading from the liquid container are closed. Fig. 4 shows the cock in an intermediate position. The body 2 is turned round to the right. The pressure pertaining in the container reaches the bottle through the pipe 33, passages 38, 39, the groove 40, the passage 10, the elongated hole 16 in the sliding member, the groove 41, the passages 42, 43, 44, 45 and 46 and the hole 47. The filling of the bottle is effected with the parts in the position shown in Fig. 5. The body is turned further to the right. The ball 29 has moved from its seating to the left. The liquid can flow in a straight line through the passages 48, 8, 31 and 36 into the bottle. The air which is displaced from the bottle escapes through the passages 49, 50, 51, 52, 53, the groove 54, the passage 13, the elongated hole 17 in the sliding member, the passage 14, the groove 54, the passages 55, 56 and the pipe 34. The body 2 is turned into the closed position before the filled bottle is removed. The body 2 is turned back into the closing position, shown in Fig. 3. Means are provided for completely emptying the passage 31 and the filling tube 36 on the filled bottle being removed. For this purpose they are connected to the outside air through the hole 47, the passages 46, 45, 44, 43, 42, the groove 41, the passage 11, the elongated hole 17 in the sliding member, the passage 12, the groove 57 and the passage 58.

What I claim is:

1. An attachment for transferring gaseous liquid under counter-pressure from a storage vessel, containing liquid under pressure, to bottles, comprising a valve casing adapted to be secured to the storage vessel and having a straight line outflow passage for the liquid, pipes adapted to extend into the storage vessel above the liquid level of the same and merging into passages provided in the valve casing and a valve member adapted to rotate in the casing, to establish a straight line path for the liquid and to control the passages in the said casing during the transferring operation, the rotary valve member consisting of a body having a transverse bore for the liquid, a flat sliding member for the passages of the pipes, said flat sliding member bearing against a slide face of the valve casing, and a closing member for the outflow passage of the valve casing, the closing member being positioned in a recess in the periphery of the said body.

2. An attachment for transferring gaseous liquid under counter-pressure from a storage vessel, containing liquid under pressure, to bottles, comprising a valve casing adapted to be secured to the storage vessel and having a straight line outflow passage for the liquid, pipes adapted to extend into the storage vessel above the liquid level of the same and merging into passages provided in the valve casing and a valve member adapted to rotate in the casing, to establish a straight line path for the liquid and to control the passages in the said casing during the transferring operation, the rotary valve member consisting of a body having a transverse bore for the liquid, a flat sliding member for the passages of the pipes, said flat sliding member bearing against a slide face of the valve casing, and a closing member for the outflow passage of the valve casing, the closing member being a valve ball and being positioned in a recess in the periphery of the said body.

3. An attachment for transferring gaseous liquid under counter-pressure from a storage vessel, containing liquid under pressure, to bottles, comprising a valve casing adapted to be secured to the storage vessel and having a straight line outflow passage for the liquid, pipes adapted to extend into the storage vessel above the liquid level of the same and merging into passages provided in the valve casing and a valve member adapted to rotate in the casing, to establish a straight line path for the liquid and to control the passages in the said casing during the transferring operation, the rotary valve member consisting of a substantially cylindrical body, guided with clearance in the valve casing, having a transverse bore for the liquid, a flat sliding member for the passages of the pipes, said flat sliding member bearing against a slide face of the valve casing, and a closing member for the outflow passage of the valve casing, the flat slide member being seated on a slide face of the valve casing.

4. An attachment for transferring gaseous liquid under counter-pressure from a storage vessel, containing liquid under pressure, to bottles, comprising a valve casing adapted to be secured to the storage vessel and having a straight line outflow passage for the liquid, pipes adapted to extend into the storage vessel above the liquid level of the same and merging into passages provided in the valve casing and a valve member adapted to rotate in the casing, to establish a straight line path for the liquid and to control the passage in the said casing during the transferring operation, the rotary valve member consisting of a body having a transverse bore for the liquid, a flat sliding member for the passages of the pipes, said flat sliding member bearing against a slide face of the valve casing, and a closing member for the outflow passage of the valve casing.

5. An attachment for transferring gaseous liquid under counter-pressure from a storage vessel, containing liquid under pressure, to bottles, comprising a valve casing adapted to be secured to the storage vessel and having a straight line outflow passage for the liquid, pipes adapted to extend into the storage vessel above the liquid level of the same and merging into passages provided in the valve casing, and a valve member adapted to rotate in the casing, to establish a straight line path for the liquid and to control the passages in the said casing during the transferring operation, the rotary valve member consisting of a body having a transverse bore for the liquid, a flat sliding member for the passages of the pipes, said flat sliding member bearing against a slide face of the valve casing, and a closing member for the outflow passage of the valve casing, the closing member being a valve ball positioned in a recess in the periphery of the said body, the said recess being substantially longer than the diameter of the ball.

6. An attachment for transferring gaseous liquid under counter-pressure from a storage vessel, containing liquid under pressure, to bottles, comprising a valve casing adapted to be secured to the storage vessel and having an outflow passage for the liquid, the straight line outflow passage being formed by a bore in the valve casing and a filling tube opening into the valve casing, the said filling tube having a lateral opening, pipes adapted to extend into the storage vessel above the liquid level in the same and merging into passages provided in the valve casing, and a valve member adapted to rotate in the casing, constituting a straight line path for the liquid and adapted to control the passages in the valve casing during the transferring operation, the rotary valve member consisting of a body having a transverse bore for the liquid which registers with bores, in the valve casing, a flat sliding member for the passages of the pipes, said flat sliding member bearing against a slide face of the valve casing, and a closing member for the outflow passage of the valve casing.

GUSTAVE STERN.